(12) United States Patent
Hachet

(10) Patent No.: US 9,174,510 B2
(45) Date of Patent: Nov. 3, 2015

(54) CLOSED PROFILE CROSSMEMBER FOR REAR AXLE OF MOTOR VEHICLE

(75) Inventor: Guillaume Hachet, Laigne en Belin (FR)

(73) Assignee: RENAULT S.A.S., Boulogne-Billancourt (FR)

( * ) Notice: Subject to any disclaimer, the term of this patent is extended or adjusted under 35 U.S.C. 154(b) by 850 days.

(21) Appl. No.: 13/496,585

(22) PCT Filed: Sep. 13, 2010

(86) PCT No.: PCT/FR2010/051897
§ 371 (c)(1),
(2), (4) Date: May 4, 2012

(87) PCT Pub. No.: WO2011/033213
PCT Pub. Date: Mar. 24, 2011

(65) Prior Publication Data
US 2012/0212041 A1 Aug. 23, 2012

(30) Foreign Application Priority Data
Sep. 17, 2009 (FR) ...................................... 09 56381

(51) Int. Cl.
*B60B 11/04* (2006.01)
*B60G 21/05* (2006.01)

(52) U.S. Cl.
CPC ........ *B60G 21/051* (2013.01); *B60G 2202/136* (2013.01); *B60G 2204/1226* (2013.01); *B60G 2206/013* (2013.01); *B60G 2206/20* (2013.01); *B60G 2206/202* (2013.01)

(58) Field of Classification Search
CPC ...... B60B 35/004; B60B 35/02; B60B 35/04; B60B 35/06; B60B 35/08
USPC ................................................ 301/124.1, 127
See application file for complete search history.

(56) References Cited

U.S. PATENT DOCUMENTS 4,200,326 A * 4/1980 Wilcox ........................... 295/23
5,597,213 A * 1/1997 Chase ......................... 301/37.43

(Continued)

FOREIGN PATENT DOCUMENTS

DE        101 02 759        7/2002
DE    10 2004 055 117       2/2006

(Continued)

OTHER PUBLICATIONS

French Search Report Issued Apr. 30, 2010 in FR 09 56381 Filed Sep. 17, 2009.

(Continued)

*Primary Examiner* — S. Joseph Morano
*Assistant Examiner* — Jean Charleston
(74) *Attorney, Agent, or Firm* — Oblon, McClelland, Maier & Neustadt, L.L.P.

(57) ABSTRACT

A twistable closed profile crossmember for a rear axle of a motor vehicle, the crossmember making it possible to connect two longitudinal arms of the axle. The crossmember includes a tube including: end portions that are each connectable to one of the two arms; an intermediate portion that is deep-drawn so as to obtain a U- or V-shaped transverse section wherein the inner walls of the tube are separated by a space; and two transition portions having a transverse section modified to connect each end portion to the intermediate portion. The crossmember further includes two inserts, each closing one end of the intermediate portion on all or part of the length of each transition portion to avoid all contact between the inner walls at the intermediate portion when the crosspiece is subject to a twisting force.

9 Claims, 2 Drawing Sheets

(56) References Cited

U.S. PATENT DOCUMENTS

| | | | |
|---|---|---|---|
| 6,233,826 B1 | 5/2001 | Wycech | |
| 6,487,886 B2* | 12/2002 | Ueno et al. | 72/57 |
| 6,510,763 B1 | 1/2003 | Streubel et al. | |
| 6,523,841 B2* | 2/2003 | Glaser et al. | 280/124.106 |
| 6,637,829 B1* | 10/2003 | Jenkins | 301/37.108 |
| 6,729,695 B2* | 5/2004 | Woelfel | 301/37.43 |
| 6,752,469 B1* | 6/2004 | Cutcher et al. | 301/37.11 |
| 7,213,815 B2* | 5/2007 | Whiteside | 280/32.6 |
| 8,894,080 B2* | 11/2014 | Fukushi et al. | 280/124.166 |
| 2008/0111419 A1* | 5/2008 | Stahel et al. | 301/37.41 |

FOREIGN PATENT DOCUMENTS

| | | | |
|---|---|---|---|
| DE | 102007062220 A1 * | 6/2009 | |
| EP | 1 724 132 | 11/2006 | |

OTHER PUBLICATIONS

International Search Report Issued Dec. 15, 2010 in PCT/FR10/51897 Filed Sep. 13, 2010.

* cited by examiner

CLOSED PROFILE CROSSMEMBER FOR REAR AXLE OF MOTOR VEHICLE

The present invention relates to the structure of a rear axle for a motor vehicle, and more particularly to the structure of a torsionally deformable closed profile crossmember making it possible to connect two longitudinal arms of the rear axle.

Such crossmembers for a rear axle are generally formed from a tube of circular, rectangular or oval section, each end portion of which is intended to be connected to one of the two axle arms, one intermediate portion of the tube being deep-drawn so as to obtain a U-shaped or V-shaped transverse section. The intermediate portion ensures flexural stiffness and torsional flexibility.

A crossmember of this type is previously disclosed, for example, in document U.S. Pat. No. 6,510,763. According to this document, in order to increase the flexural stiffness, in particular at the level of the two transitional portions connecting each end portion of the crossmember to the intermediate portion, these two transitional portions are filled with a synthetic or metallic foam. The foam is injected directly through the ends of the crossmember. As a variant, crystals or a metallic powder mixed with foaming agents are introduced through the ends of the crossmember into the transitional portions and are then expanded by heating. In both cases, filling of the transitional portions is possible only inasmuch as the walls of the crossmember in the intermediate portion are attached one to the other.

In such configurations, however, the walls that are in contact in the intermediate portion are displaced relative to one another as the crossmember is placed under torsion, which causes fretting corrosion of the internal walls. In order to overcome this disadvantage, deep-drawing of the tube forming the crossmember in such a way as to guarantee a minimum distance between the internal walls in the intermediate portion is already familiar, in particular from document FR 2 805 479 in the name of the applicant.

Nevertheless, when the crossmember is subjected to torsion, the walls will experience relative displacement so that certain zones of the walls will come into contact. This situation is represented schematically in FIG. 1, which illustrates, in a section of a crossmember 1 taken in the intermediate portion, a contact zone 2 between the upper wall 10 and the lower wall 11 when the crossmember is subjected to a torsional loading (arrow F1) causing the two walls to move closer together (as depicted by the arrows F2 and F3). The result is that the crossmember remains locally exposed to problems of fretting corrosion.

The object of the present invention is to suppress the risks of corrosion in the intermediate portion of a closed profile crossmember by increasing the resistance of the crossmember in terms of its stiffness.

In order to achieve this, the subject of the invention is a torsionally deformable closed profile crossmember for the rear axle of a motor vehicle making it possible to connect two longitudinal arms of said axle, said crossmember being formed from a tube comprising end portions that are each connectable to one of the two arms; an intermediate portion that is deep-drawn so as to obtain a U-shaped or V-shaped transverse section wherein the inner walls of the tube are separated by a space; and two transition portions, the transverse section of which is modified so as to connect each end portion to the intermediate portion, characterized in that the crossmember in addition comprises two inserts, each closing one end of the intermediate portion for all or part of the length of each transition portion, so as to avoid all contact between the inner walls at the level of the intermediate portion when the crossmember is subjected to a torsional loading.

Each insert preferably comprises a core, for example made of a plastic material of the polypropylene type, enclosed by a layer of adhesive material providing a means for maintaining the insert against the internal walls of the tube.

The layer of adhesive material may be is a polyurethane foam or even a thermosetting adhesive.

Means for the mechanical connection of the two inserts to one another may be provided in order to guarantee that the inserts are kept firmly in place inside the crossmember.

Different advantages and characteristics of the invention will be more readily appreciated against the background of the following description of illustrative embodiments with reference to the accompanying figures, in which:

FIG. 1, already described, shows a section of a closed profile crossmember according to the prior art in the intermediate portion of the crossmember;

Figure 1:
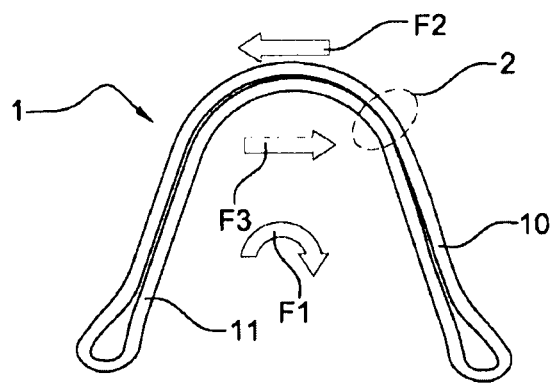
Figure 2:
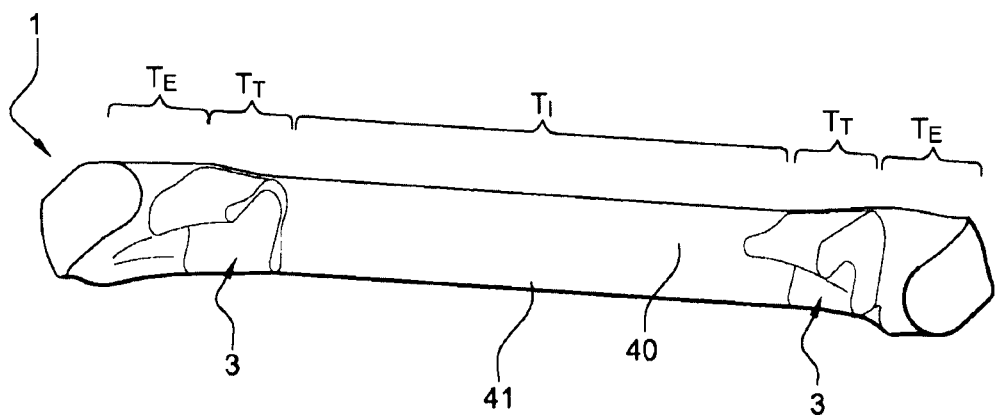
FIG. 2 shows a perspective view of a crossmember according to a first possible embodiment according to the present invention.

A first possible embodiment of a crossmember according to the invention is now described with reference to FIGS. 2 and 3a to 3c. In FIG. 2, a torsionally deformable closed section crossmember 1 is formed conventionally from a tube comprising two end portions TE that are each connectable to one of the two arms (not depicted here) of a rear axle of a motor vehicle. The tube further comprises an intermediate portion TI that is deep-drawn so as to obtain a U-shaped or V-shaped transverse section.

As previously indicated, the tube, preferably made of steel, is deep-drawn in this intermediate zone so that a certain space exists between the internal walls (visible as reference designations 10 and 11 in FIG. 6), in such a way as to prevent fretting corrosion. The tube forming the crossmember 1 also comprises two transitional portions $T_T$, of which the cross section is modified to connect each end portion TE to the intermediate portion TI.

According to the invention, the crossmember 1 additionally consists of two inserts 3, each of which closes one end of the intermediate portion TI for all or part of the length of each transition portion Tj.

The positioning of an insert 3 to either side of the crossmember permits the relative movement of the two walls of the tube to be reduced, thereby avoiding all contact between these walls at the level of the intermediate portion when the crossmember 1 is subjected to a torsional loading.

Figure 3A:
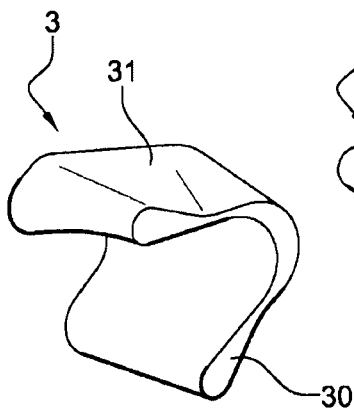
FIGS. 3a and 3b are perspective views of the two inserts in FIG. 2.
Figure 3B:
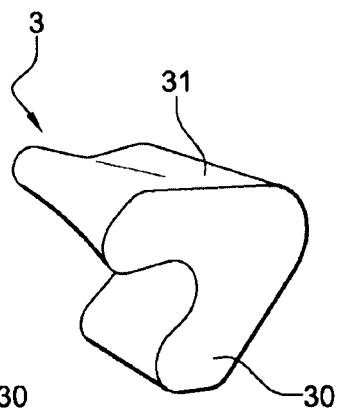
Figure 3C:
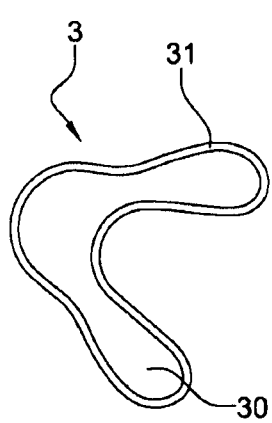
FIG. 3c is a view shown in cross section in the central zone of an insert in FIG. 2.

FIGS. 3a to 3c show different views of the insert 3. This is preferably in the form of a core 30 made of a material that is sufficiently rigid to permit the relative displacement of the walls to be reduced, typically being a plastic material of the polypropylene type. In order to ensure that the insert is maintained in position inside the crossmember, the core 30 is advantageously enclosed by a layer 31 of a few millimeters of an adhesive material. This layer 31 may be constituted by a polyurethane foam or by a thermosetting adhesive. In both cases, the inserts are positioned inside the crossmember 1 by introducing each insert through the end portions $T_E$-. A heating stage for the crossmember 1 equipped with the two inserts 3 then permits either the expansion of the foam or the hardening of the adhesive. At the end of this heating stage, the inserts 3 are retained inside the crossmember 1. In the figures, it can be appreciated that the external surface of each insert 3 completely adopts the forms of the internal walls of the crossmember. Thus, the transverse section of an insert 3 varies in the same way as the transverse section of the portion of the crossmember that it occupies, so as to close the crossmember perfectly.

The inserts 3 are airtight and afford protection not only against fretting corrosion, but also against corrosion by oxidation inside the portion situated between the two inserts.

Furthermore, the inserts enable the level of torsional stress to be reduced by enlarging the stress zones at the level of the droplet-shaped loops, that is to say at the level of the end zones of the U-shaped or V-shaped section of the crossmember 1. It is thus conceivable advantageously to reduce the thickness of the walls of the tube, which permits a lighter and less costly crossmember to be obtained.

Figure 4:
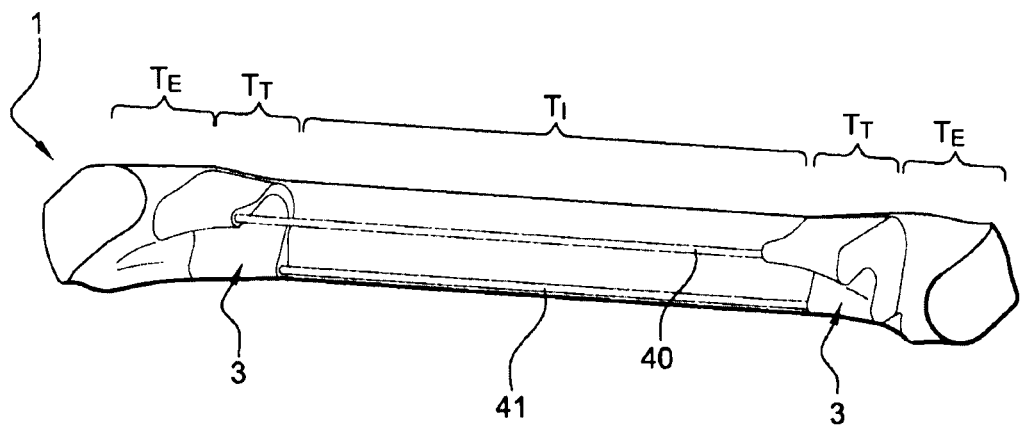
FIG. 4 shows a crossmember according to a second possible embodiment according to the present invention.
Figure 5:
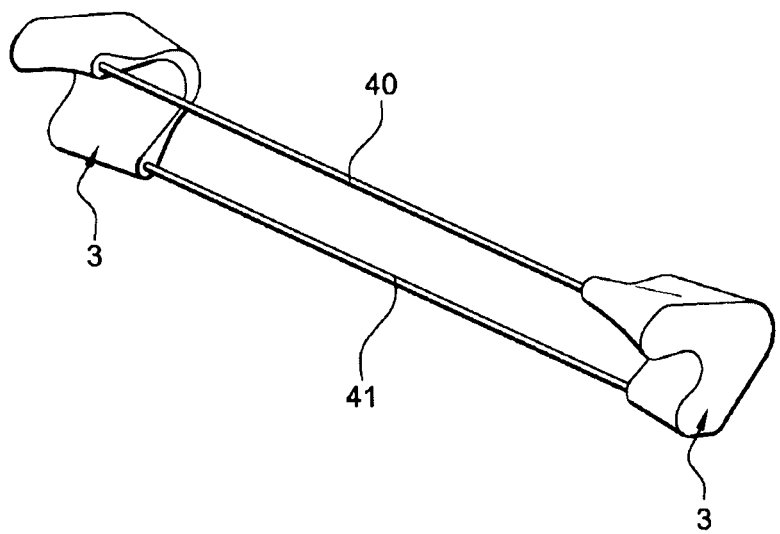
FIG. 5 is a view shown in perspective of the two mechanically connected inserts in FIG. 4.
Figure 6:
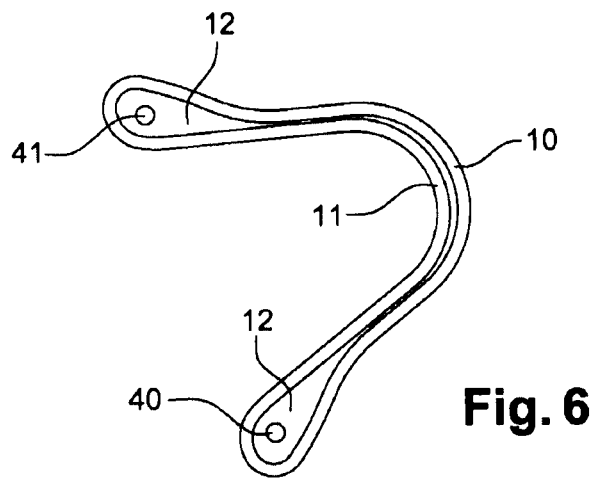
FIG. 6 is a view shown in cross section taken in the intermediate portion of the crossmember according to FIG. 4.

In order to reinforce the retention of the inserts inside the crossmember, it is conceivable advantageously to connect the inserts 3 mechanically one to another. FIGS. 4 to 6 illustrate a second embodiment in which the inserts 3 are retained inside the crossmember 1 not only thanks to the adhesive layer enclosing the core of each insert 30, but also thanks to means of mechanical connection. The means of mechanical connection here are in the form of two cables 40, 41, preferably made of steel, extending substantially parallel with one another inside the crossmember between the two inserts 3, each cable extending more specifically longitudinally inside one of the two droplet-shaped loops 12 of the crossmember 1, as can be appreciated in particular in FIG. 6. Each end of the cables 40 and 41 is fixed to one of the two inserts 3 by any fixing means such as a screw or other fixing. The manufacture of such a crossmember starts by introducing one of the inserts 3, to which the ends of cables 40, 41 in the crossmember have been fixed, and the other insert is then introduced and fixed to the free ends of the cables. The whole assembly is then heated as described previously, specifically in order to permit the adhesive layer 31 of the inserts 3 to adhere effectively to the internal walls of the crossmember. The use of flexible cables is preferred inasmuch as these cables are light and less expensive. Their introduction into the interior of the crossmember is less easy, however, and it is conceivable, in order to facilitate the assembly operation, to replace the cables by rigid rods. In any event, the length of the cables or the rigid rods must be adapted to correspond to the distance separating the inserts once they have been positioned.

The invention claimed is:

1. A torsionally deformable closed profile crossmember for a rear axle of a motor vehicle making it possible to connect two longitudinal arms of the axle, the crossmember comprising:
    a tube comprising end portions that are each connectable to one of the two arms;
    an intermediate portion that is deep-drawn so as to obtain a U-shaped or V-shaped transverse section in which inner walls of the tube are separated by a space;
    two transition portions having a transverse section modified to connect each end portion to the intermediate portion; and
    two inserts, each closing one end of the intermediate portion for all or part of the length of each transition portion, to avoid all contact between the inner walls at a level of the intermediate portion when the crossmember is subjected to a torsional loading.

2. The crossmember as claimed in claim 1, wherein each insert comprises a core enclosed by a layer of adhesive material for maintaining the insert against the inner walls of the tube.

3. The crossmember as claimed in claim 2, wherein the layer is a polyurethane foam.

4. The crossmember as claimed in claim 2, wherein the layer is a thermosetting adhesive.

5. The crossmember as claimed in claim 2, wherein the core is made of a plastic material of polypropylene type.

6. The crossmember as claimed in claim 1, further comprising means for mechanical connection of the two inserts to one another.

7. The crossmember as claimed in claim 6, wherein the means for mechanical connection comprises two cables extending substantially parallel with one another inside the crossmember between the two inserts, each of the cables extending longitudinally inside one droplet-shaped loop of the crossmember, each end of the cables being fixed to one of the two inserts.

8. The crossmember as claimed in claim 6, wherein the means for mechanical connection comprises two rigid rods extending substantially parallel with one another inside the crossmember between the two inserts, each of the rods extending longitudinally inside one droplet-shaped loop of the crossmember, each end of the rods being fixed to one of the two inserts.

9. The crossmember as claimed in claim 1, wherein the inserts are airtightly inserted in the tube such that the intermediate portion is sealed.

* * * * *